April 22, 1969   L. W. LEMKE   3,439,636
CULTIVATOR TINE WITH FLUID DISPENSER
Filed May 29, 1967
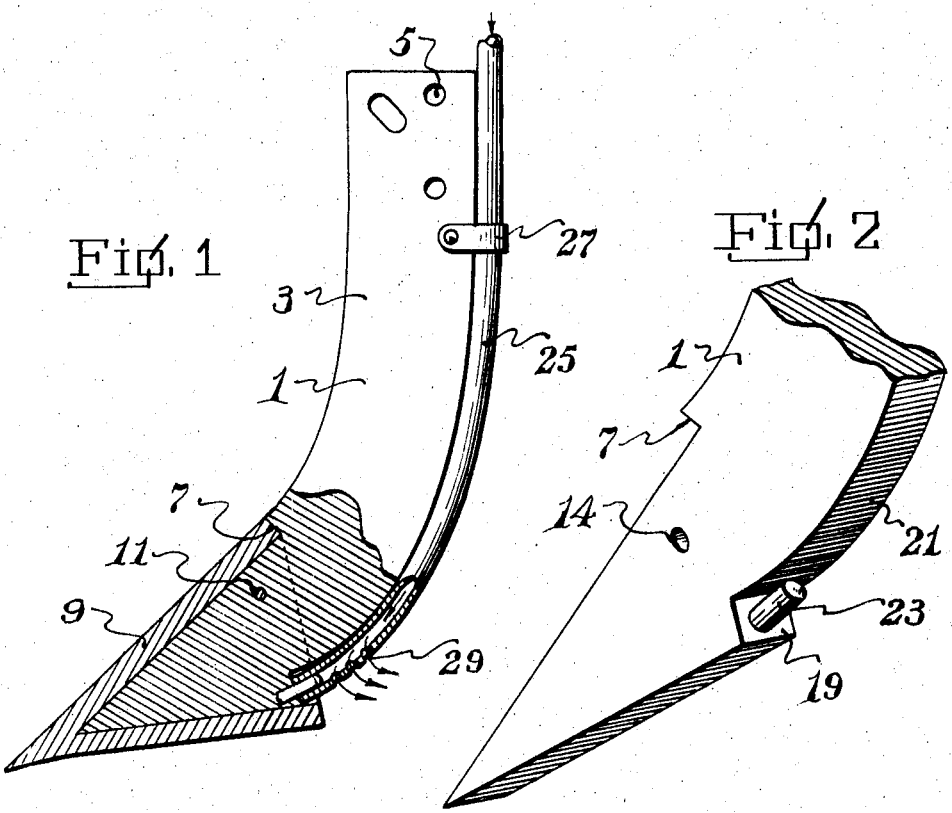
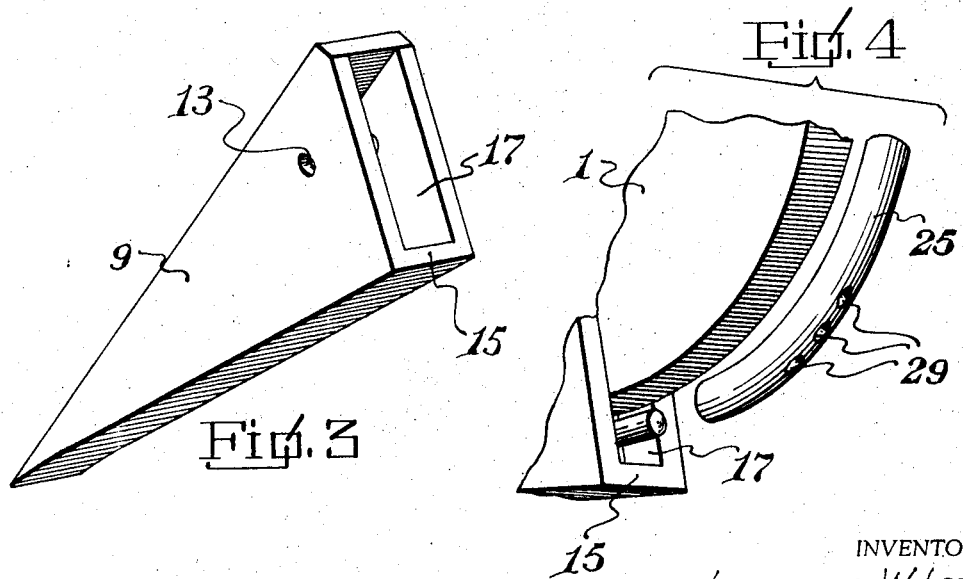
INVENTOR.
Lawrence W. Lemke
BY
Young & Thompson
ATTORNEYS

United States Patent Office 3,439,636
Patented Apr. 22, 1969

3,439,636
CULTIVATOR TINE WITH FLUID DISPENSER
Lawrence W. Lemke, Rte. 1, Gentry, Ark. 72734
Filed May 29, 1967, Ser. No. 641,893
Int. Cl. A01c 23/02
U.S. Cl. 111—7
4 Claims

ABSTRACT OF THE DISCLOSURE

The combination of a cultivation tine and a liquid dispenser, secured together in such a manner that the dispenser is protected from damage thereto.

---

The present invention relates to cultivator tines with fluid dispensers, of the type adapted to treat soil with a fluid for fertilization or killing insect larvae or other purposes.

It is an object of the present invention to provide a cultivator tine adapted to dispense fluid, in which the fluid-dispensing structure is guarded against becoming damaged or clogged with dirt.

It is another object of the present invention to provide such a cultivator tine having a replaceable tip, in which the tip can be replaced without disturbing the fluid-dispensing structure.

Finally, it is an object of the present invention to provide such a cultivator tine which will be relatively simple and inexpensive to manufacture, easy to assemble and repair, and rugged and durable in use.

Other objects and advantages of the present invention will become apparent from a consideration of the following description, taken in connection with the accompanying drawing, in which:

FIGURE 1 is a side elevational view with parts broken away, showing a tine according to the present invention;

FIGURE 2 is a fragmentary perspective view of the present invention with the tip and the fluid-dispensing conduit removed;

FIGURE 3 is a perspective view of the removed tip; and

FIGURE 4 is a fragmentary enlarged perspective view showing the manner of assembly of the fluid-dispensing conduit on the tine.

Referring now to the drawing in greater detail, there is shown a cultivator tine 1, comprising an elongated upright generally flat shank 3 having holes 5 adjacent its upper end for attachment to an agriculatural implement or machine. It is of course to be understood that a plurality of tines 1 will be provided, ordinarily in side-by-side relationship, for the purpose of cultivating a selected width of ground upon one passage of the cultivator.

Adjacent its lower end, tine 1 is provided with a forwardly downwardly facing abutment shoulder 7 on the front surface of the tine. A replaceable hollow generally triangular rearwardly open tip 9 is carried by the lower end of the tine and abuts along its upper edge against shoulder 7, the forward upward surfaces of tine 1 and tip 9 in this region being flush. Shoulder 7 thus provides a locator surface for tip 9. Tip 9 may be force fitted on the tine and may be removed by hammering, or it may be detachably and replaceably held on the tine by means of a pin 11 passing through opposed aligned holes 13 through opposite side walls of tip 9 and through a corresponding hole 14 in tine 1.

The lower rear edge portion of tip 9 provides a skirt 15 which borders at least the lower side and preferably also the two opposite lateral sides of a recess 17 that opens rearwardly, as best seen in FIG. 4. At its forward end, recess 17 is closed by a rearwardly facing shoulder 19 on the tine. The upper side of recess 17 is defined by a portion of the underside 21 of the tine. A stud 23 extends rearwardly within recess 17 in spaced relationship to all the side walls of recess 17. Preferably, stud 23 is simply a pin sunk in and extending rearwardly and upwardly away from shoulder 19.

A conduit 25 of metal or other highly wear-resistant material extends downwardly along the rear and underside of the tine and is secured in place thereon by a clamp 27. Conduit 25 terminates at its lower end in recess 17 with its end abutting against shoulder 19. The end of conduit 25 thus surrounds stud 23 which may be in close-fitting relationship with stud 23 and/or the side walls of recess 17 so as to provide a firm seat for this end of conduit 25.

Conduit 25 has a series of holes 29 through the lower rear wall thereof adjacent recess 17. Holes 29 are for the emission of a treatment fluid from a source of fluid under pressure (not shown), such as anhydrous ammonia or any of the other well-known fluid treating agents that can be supplied either in liquid or in vapor phase as desired, the chemical nature and flow rate of such fluids being of course selected according to well-known principles in accordance with the job that is to be done.

It will thus be observed that skirt 15 shields conduit 25 from the front, so that as the tine passes through dirt, nothing can strike and damage or dislodge conduit 25. Moverover, holes 29 are in such a position behind skirt 15 and are so oriented that they will not become clogged with dirt.

At the same time, however, tip 9 can be quickly and easily removed and replaced when borken or worn, without dislodging or even touching conduit 25.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A cultivator tine having a tip, a conduit for fluid extending downwardly at and attached to the rear of the tine, the tip having a downwardly extending rearwardly facing portion, and a similarly shaped tine portion thereabove and forwardly thereof to define a rearwardly opening chamber, the lower end of said conduit being fixed in said chamber, and means defining at least one rearwardly facing exit opening for fluid from a lower portion of the conduit.

2. A cultivator tine as claimed in claim 1, said last-named means comprising means defining a plurality of openings in the rear wall of the conduit behind said tip.

3. A cultivator tine as claimed in claim 1, the lower end of the conduit extending forwardly.

4. A cultivator tine as claimed in claim 1, and further comprising a rearwardly extending projection in said chamber, said projection extending into the end of the conduit.

References Cited

UNITED STATES PATENTS

| 2,849,970 | 9/1958 | Coberly et al. | 111—7 |
| 2,874,656 | 2/1959 | Bennett | 111—7 |
| 2,988,026 | 6/1961 | Heckathorn | 111—7 |
| 3,003,664 | 10/1961 | Cave | 111—7 XR |
| 3,188,989 | 6/1965 | Johnston | 111—7 |
| 3,259,087 | 7/1966 | Horton | 111—7 |
| 3,326,152 | 6/1967 | Frantzen | 111—7 |

ROBERT E. BAGWILL, *Primary Examiner.*